(12) United States Patent
Weiss

(10) Patent No.: US 7,779,798 B2
(45) Date of Patent: Aug. 24, 2010

(54) METHOD AND DEVICE FOR DETERMINING A SWITCHOVER CONDITION IN ORDER TO INITIATE A VALVE LIFT CHANGEOVER IN AN INTERNAL COMBUSTION ENGINE

(75) Inventor: Frank Weiss, Pentling/Grasslfing (DE)

(73) Assignee: Continental Automotive GmbH, Hannover (DE)

( * ) Notice: Subject to any disclaimer, the term of this patent is extended or adjusted under 35 U.S.C. 154(b) by 269 days.

(21) Appl. No.: 12/067,217

(22) PCT Filed: Sep. 4, 2006

(86) PCT No.: PCT/EP2006/065953

§ 371 (c)(1),
(2), (4) Date: Mar. 18, 2008

(87) PCT Pub. No.: WO2007/057245

PCT Pub. Date: May 24, 2007

(65) Prior Publication Data

US 2008/0257287 A1     Oct. 23, 2008

(30) Foreign Application Priority Data

Sep. 30, 2005   (DE) ................. 10 2005 047 023

(51) Int. Cl.
  *F01L 1/34*     (2006.01)
(52) U.S. Cl. .............. 123/90.16; 123/90.15; 123/345
(58) Field of Classification Search ........... 123/90.15, 123/90.16, 90.17, 90.18, 90.27, 90.31, 345, 123/346
See application file for complete search history.

(56) References Cited

U.S. PATENT DOCUMENTS

| 6,513,493 | B1 | 2/2003 | Robichaux et al. ......... 123/399 |
| 6,920,851 | B2 | 7/2005 | Machida et al. ......... 123/90.16 |
| 7,406,931 | B2* | 8/2008 | Nakamura ............... 123/90.15 |
| 2005/0001480 | A1 | 1/2005 | Tabata et al. ................ 303/141 |

FOREIGN PATENT DOCUMENTS

| DE | 101 38 106 A1 | 3/2002 |
| DE | 103 57 741 A1 | 7/2004 |
| EP | 1 403 487 A2 | 3/2004 |

OTHER PUBLICATIONS

Written Opinion of the International Searching Authority (Supplementary Sheet) PCT/EP2006/065953, 2 pages, 2005.

* cited by examiner

*Primary Examiner*—Ching Chang
(74) *Attorney, Agent, or Firm*—King & Spalding L.L.P.

(57) ABSTRACT

In a method for determining the switchover condition in order to initiate a valve lift changeover in an internal combustion engine, the torque requirement (TQ REQ) is determined. Also, an operational variable of the internal combustion engine, which is representative for an operational state of the internal combustion engine, is determined. According to the operational variable, a duration of time (T), which is required in the current operational state in order to carry out at least one prepared amount for the valve lift changeover, is determined. An alteration value, which is representative for the alteration of the torque condition (TQ_REQ), is determined. The valve lift changeover is initiated by the duration of time (T) and the alteration value (TQ_REQ) according to the torque requirement (TQ REQ).

20 Claims, 4 Drawing Sheets

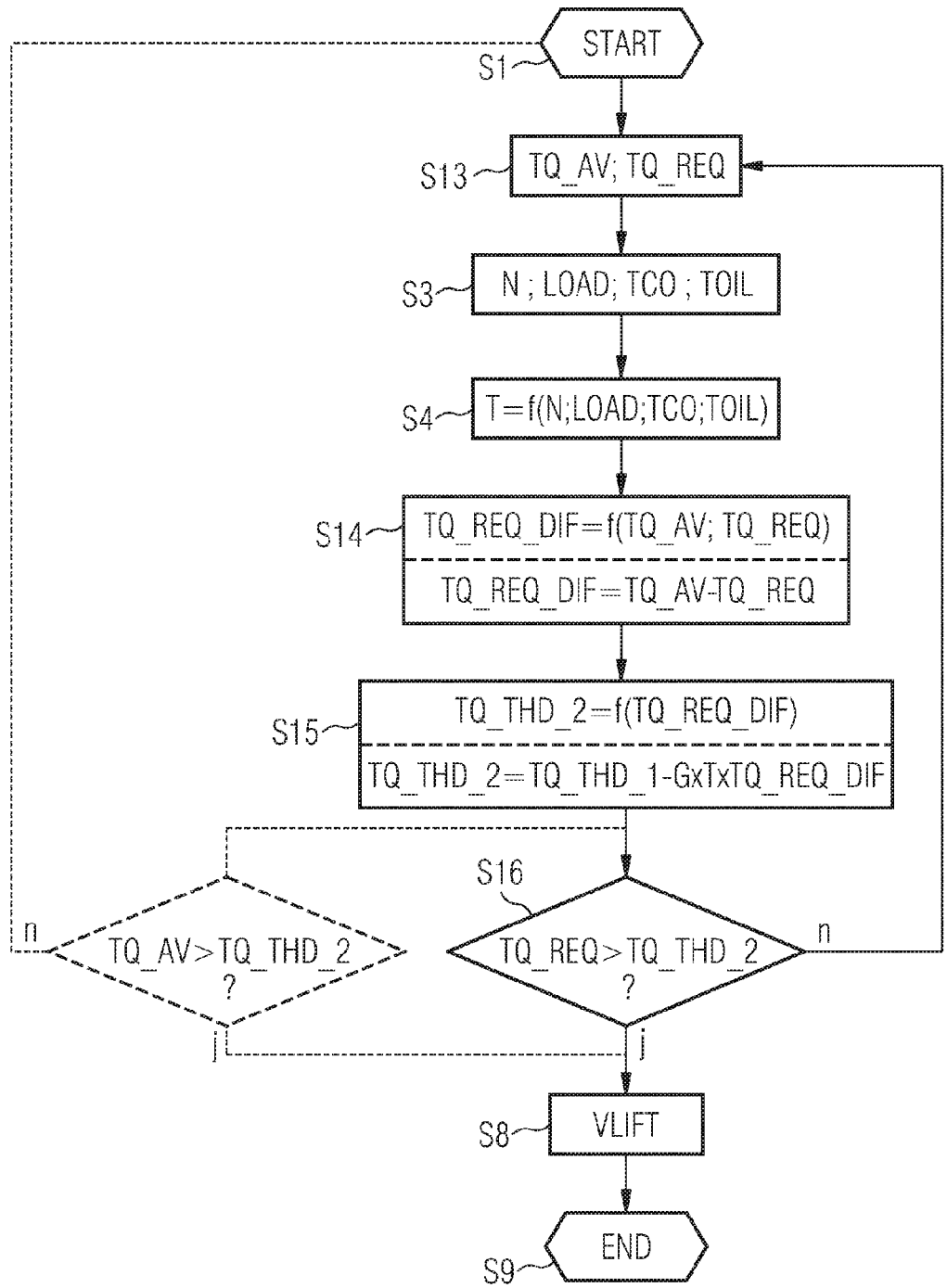

ated the time period and the change value, the valve-lift changeover.

METHOD AND DEVICE FOR DETERMINING A SWITCHOVER CONDITION IN ORDER TO INITIATE A VALVE LIFT CHANGEOVER IN AN INTERNAL COMBUSTION ENGINE

CROSS-REFERENCE TO RELATED APPLICATIONS

This application is a U.S. national stage application of International Application No. PCT/EP2006/065953 filed Sep. 4, 2006, which designates the United States of America, and claims priority to German application number 10 2005 047 023.8 filed Sep. 30, 2005, the contents of which are hereby incorporated by reference in their entirety.

TECHNICAL FIELD

The invention relates to a method for determining a switchover condition in order to initiate a valve-lift changeover in an internal combustion engine. The internal combustion engine comprises an intake section, an exhaust section and at least one cylinder having a combustion chamber. The internal combustion engine also comprises a gas inlet valve, a gas outlet valve and a valve-lift adjustment device, by means of which a valve lift of the gas inlet valve and/or of the gas outlet valve can be adjusted. The invention also relates to a corresponding device for determining the switchover condition in order to initiate the valve-lift changeover in the internal combustion engine.

BACKGROUND

From DE 103 57 741 A1, a variable valve device for an internal combustion engine and a method thereof are known. In the internal combustion engine which is equipped with the variable valve device, a target lift amount of an intake valve is limited to a predetermined value or greater if the variation in combustion reaches an allowable value or greater. The variable valve device changes the lift amount of the intake valve if the target lift amount of the intake valve is the predetermined value or less.

SUMMARY

A method and a device can be created which respectively enable in a simple manner precise controlling of an internal combustion engine during a valve-lift changeover. According to an embodiment, a method for determining a switchover condition in order to initiate a valve-lift changeover in an internal combustion engine, comprising an intake section (1) and an exhaust section, at least one cylinder having a combustion chamber, a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled, a valve-lift adjustment device, by means of which a valve lift of the gas inlet valve and/or of the gas outlet valve can be adjusted, the method may comprise the steps of: determining a torque requirement, determining an operating variable of the internal combustion engine, which operating variable is representative of an operating state of the internal combustion engine, depending on the operating variable, determining a time period which is needed in the current operating state in order to carry out at least one preparatory measure for the valve-lift changeover, determining a change value which is representative of a change in the torque requirement, and depending on the torque requirement, initi- According to a further embodiment, depending on the torque requirement, the time period and the change value, a predicted torque which is representative of the torque requirement after the time period, given a linear change in the torque requirement over the time period, may be determined, and depending on the predicted torque, the valve-lift changeover may be initiated if the predicted torque exceeds a predetermined first threshold value. According to a further embodiment, depending on the time period and the change value which is representative of a change in the torque requirement, a second threshold value may be determined, and the valve-lift changeover may be initiated if the torque requirement exceeds the determined second threshold value. According to a further embodiment, the change value which may be representative of the change in the torque requirement comprises a gradient of the torque requirement and/or a gradient of a pedal value. According to a further embodiment, the operating variable which may be representative of the operating state of the internal combustion engine comprises an engine speed and/or a load variable and/or an oil temperature and/or a cooling water temperature of the internal combustion engine.

According to another embodiment, a method for determining a switchover condition in order to initiate a valve-lift changeover in an internal combustion engine, comprising an intake section and an exhaust section, at least one cylinder having a combustion chamber, a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled, a valve-lift adjustment device, by means of which a valve lift of the gas inlet valve and/or of the gas outlet valve can be adjusted, the method may comprise the steps of: determining a torque requirement and an actual torque, determining an operating variable of the internal combustion engine, which operating variable is representative of an operating state of the internal combustion engine, depending on the operating variable, determining a time period which is needed in the current operating state in order to carry out at least one preparatory measure for the valve-lift changeover, and depending on the actual torque, initiating the torque requirement and the time period, the valve-lift changeover.

According to a further embodiment, depending on the actual torque, the torque requirement and the time period, a predicted torque which is representative of the actual torque after the time period, given a linear change in the actual torque over the time period, may be determined, depending on the predicted torque, the valve-lift changeover may be initiated if the predicted torque exceeds a predetermined first threshold value. According to a further embodiment, depending on the time period, the torque requirement and the actual torque, a second threshold value may be determined, and the valve-lift changeover may be initiated if the torque requirement or the actual torque exceeds the determined second threshold value. According to a further embodiment, the time period may be determined depending on a difference between the torque requirement and the actual torque. According to a further embodiment, the operating variable which is representative of the operating state of the internal combustion engine may comprise an engine speed and/or a load variable and/or an oil temperature and/or a cooling water temperature of the internal combustion engine.

According to another embodiment, a device for determining a switchover condition in order to initiate a valve-lift changeover in an internal combustion engine, may comprise an intake section and an exhaust section, at least one cylinder having a combustion chamber, a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled, a valve-lift adjustment device, by means of which a valve lift of the gas inlet valve and/or of the gas outlet valve can be adjusted, wherein the device is operable to determine a torque requirement, to determine an operating variable of the internal combustion engine, which operating variable is representative of an operating state of the internal combustion engine, to determine, depending on the operating variable, a time period which is needed in the current operating state in order to carry out preparatory measures for the valve-lift changeover, to determine a change value which is representative of a change in the torque requirement, and to initiate the valve-lift changeover depending on the torque requirement, the change value and the time period.

According to another embodiment, a device for determining a switchover condition in order to initiate a valve-lift changeover in an internal combustion engine, may comprise an intake section and an exhaust section, at least one cylinder having a combustion chamber, a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled, a valve-lift adjustment device, by means of which a valve lift of the gas inlet valve and/or of the gas outlet valve can be adjusted, wherein the apparatus is operable to determine a torque requirement and an actual torque, to determine an operating variable of the internal combustion engine, which operating variable is representative of an operating state of the internal combustion engine, to determine, depending on the operating variable, a time period which is needed in the current operating state in order to carry out preparatory measures for the valve-lift changeover, and to initiate the valve-lift changeover depending on the torque requirement, the actual torque and the time period.

BRIEF DESCRIPTION OF THE DRAWINGS

Exemplary embodiments of the invention will be explained in detail below with reference to the schematic drawings, in which:

FIG. 5 shows a flow diagram of a third program for determining the switchover condition.

DETAILED DESCRIPTION

Figure 1:
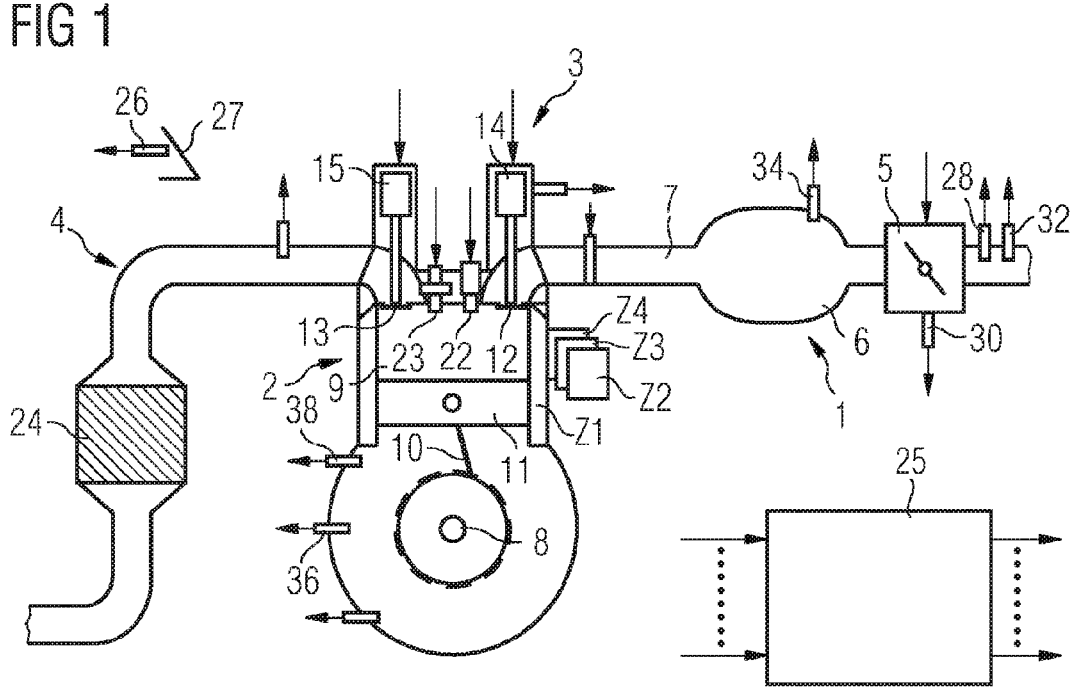
FIG. 1 shows an internal combustion engine.

According to a first aspect, a method and a corresponding device determine a switchover condition in order to initiate a valve-lift changeover in an internal combustion engine. The internal combustion engine comprises an intake section, an exhaust section and at least one cylinder having a combustion chamber. The internal combustion engine also comprises a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled. A valve-lift adjustment device enables adjustment of a valve lift of the gas inlet valve and/or of the gas outlet valve. In order to determine the switchover condition, a torque requirement is determined and an operating variable of the internal combustion engine is determined, which operating variable is representative of an operating state of the internal combustion engine. Depending on the operating variable, a time period is determined which is needed in the current operating state in order to carry out at least one preparatory measure for the valve-lift changeover. A change value which is representative of a change in the torque requirement is determined. The valve-lift changeover is initiated, depending on the torque requirement, the time period and the change value.

If the time period which is needed in the current operating state in order to carry out the preparatory measure for the valve-lift changeover depends on the operating state, the timely initiation of the preparatory measure depending on the change value and the time period enables a precise valve-lift changeover. The time period may, for example, be representative of a crankshaft angle of a crankshaft of the internal combustion engine. The valve-lift changeover is in this way always carried out under similar conditions, irrespective of the operating state of the internal combustion engine. The determining of the switchover condition, depending on the torque requirement, the time period and the change value, contributes to a precise determining of the switchover condition and to precise controlling of the internal combustion engine during the valve-lift changeover.

In an advantageous embodiment of the first aspect, a predicted torque is determined depending on the torque requirement, the time period and the change value, which predicted torque is representative of the torque requirement after the time period, given a linear change in the torque requirement over the time period. Depending on the predicted torque, the valve-lift changeover is initiated if the predicted torque exceeds a predetermined first threshold value. This makes it possible to determine the switchover condition in a particularly simple manner and to initiate the valve-lift changeover at the correct time.

In a further advantageous embodiment of the first aspect, a second threshold value is determined depending on the time period and the change value which is representative of the change in the torque requirement. The valve-lift changeover is initiated if the torque requirement exceeds the determined second threshold value. This makes it possible to determine the switchover condition in a particularly simple manner and to initiate the valve-lift changeover at the correct time.

In a further advantageous embodiment of the first aspect, the change value which is representative of the change in the torque requirement comprises a gradient of the torque requirement and/or a gradient of an accelerator-pedal position of an accelerator pedal which may be disposed in a motor vehicle in which the internal combustion engine may be disposed. This makes it possible to determine the predicted torque and/or the second threshold value in a particularly precise manner.

In a further advantageous embodiment of the first aspect, the operating variable which is representative of the operating state of the internal combustion engine comprises an engine speed and/or a load variable and/or an oil temperature and/or a cooling-water temperature of the internal combustion engine.

This makes it possible to determine the operating state of the internal combustion engine in a particularly precise manner.

According to a second aspect, a method and a corresponding device determine the switchover condition in order to initiate the valve-lift changeover in an internal combustion engine. A torque requirement and an actual torque are determined. An operating variable of the internal combustion engine is determined, which operating variable is representative of the operating state of the internal combustion engine. Depending on the operating variable, a time period is determined which is needed in the current operating state in order to carry out at least one preparatory measure for the valve changeover. The valve-lift changeover is initiated, depending on the actual torque, the torque requirement and the time period. The initiating of the valve-lift changeover depending on the actual torque, the torque requirement and the time period contributes in a simple manner to a precise determining of the switchover condition, to the timely initiating of the valve-lift changeover and to precise controlling of the internal combustion engine during the valve-lift changeover.

In an advantageous embodiment of the second aspect, the predicted torque is determined depending on the actual torque, the torque requirement and the time period. Depending on the predicted torque, the valve-lift changeover is initiated if the predicted torque exceeds a predetermined first threshold value. This makes it possible to determine the switchover condition in a particularly simple manner.

In a further advantageous embodiment of the second aspect, a second threshold value is determined depending on the time period, the torque requirement and the actual torque. The valve-lift changeover is initiated if the torque requirement or the actual torque exceeds the determined second threshold value. This makes it possible in a particularly simple manner to initiate the valve-lift changeover at the correct time.

In a further advantageous embodiment of the second aspect, the time period is determined depending on a difference between the torque requirement and the actual torque. This makes it possible to determine the time period in a particularly precise manner.

In a further advantageous embodiment of the second aspect, the operating variable which is representative of the operating state of the internal combustion engine comprises an engine speed and/or a load variable and/or an oil temperature and/or a coolant temperature of the internal combustion engine. This makes it possible to determine the operating state in a particularly precise manner.

Elements of the same design or function are labeled with the same reference characters in all the figures.

An internal combustion engine (FIG. 1) comprises an intake section 1, an engine block 2, a cylinder head 3 and an exhaust section 4. The intake section 1 preferably may comprise a throttle valve 5 and also a collector 6 and an inlet manifold 7 which is routed to a cylinder Z1 via an inlet channel into the engine block 2. The engine block 2 also comprises a crankshaft 8 which is coupled via a connecting rod 10 to the piston 11 of the cylinder Z1. The internal combustion engine can be preferably disposed in a motor vehicle.

The cylinder head 3 comprises a valve gear comprising at least one gas inlet valve 12, at least one gas outlet valve 13 and valve drives 14, 15.

Figure 2:
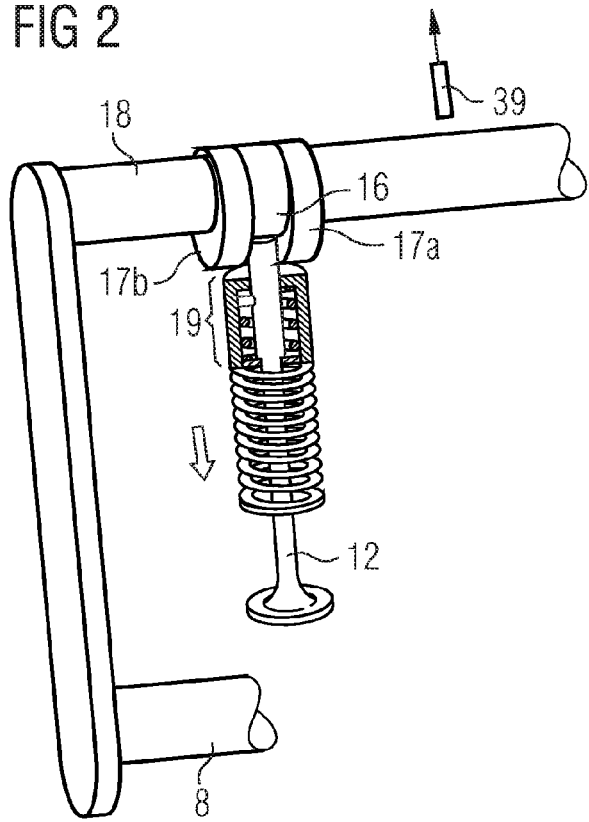
FIG. 2 shows a valve-lift adjustment device.

A camshaft 18 is provided (FIG. 2) which comprises cams 16, 17a, 17b which act upon the gas inlet valve 12. Also provided is a valve-lift adjustment device 19 which is designed such that it can be used either to bring the cam 16 with a low valve lift X1 to act on a tappet of the gas inlet valve 12 or, in a different switched position of the valve-lift adjustment device 19, to bring the cams 17a, 17b with a high valve lift X2 to act on the tappet of the gas inlet valve 12. The valve-lift adjustment device may, for example, form part of a cup tappet associated with the gas inlet valve 12. It may, however, also be designed as a further element coupled mechanically between the cams 16, 17a, 17b. It may also be designed such that, for example, it displaces the camshaft 18 axially, and in this way the changeover can be effected from a higher to a lower valve lift or vice versa. The internal combustion engine may also comprise one or more further valve-lift adjustment devices which is/are associated with further gas inlet valves 12 and/or one or more gas outlet valves 13.

The cylinder head also comprises an injection valve 22 and a spark plug 23. Alternatively, the injection valve 22 may also be disposed in the inlet manifold 7.

A control device 25 is provided with which sensors which detect different measurable variables and respectively determine the value of the measurable variable are associated. Operating variables comprise the measurable variables and variables of the internal combustion engine derived from these measurable variables. Operating variables can be representative of an operating state of the internal combustion engine. The control device 25 determines, depending on at least one of the operating variables, at least one control variable which is then converted into one or more actuating signals for controlling the actuating elements by means of corresponding actuating drives. The control device 25 can also be designated a device for controlling the internal combustion engine, particularly during the valve-lift changeover.

The sensors are a pedal position sensor 26 which detects an accelerator-pedal position of an accelerator pedal 27, an air-mass sensor 28 which detects an air-mass flow upstream of the throttle valve 5, a throttle-valve position sensor 30 which detects an opening angle of a throttle valve, a first temperature sensor 32 which detects an intake-air temperature, an inlet-manifold pressure sensor 34 which detects an inlet-manifold pressure in the collector 6 and a crankshaft-angle sensor 36 which detects a crankshaft angle with which an engine speed N is then associated. A second temperature sensor 38 detects a coolant temperature TCO. A third temperature sensor may also be provided for detecting an oil temperature TOIL of the internal combustion engine. Furthermore, a camshaft-angle sensor 39 is provided which detects a camshaft angle. Depending on the embodiment, any subset of the sensors stated may be present or additional sensors may also be present.

The actuating elements are, for example the throttle valve 5, the gas inlet and gas outlet valves 12, 13, the valve-lift adjustment device 19, the injection valve 22 and/or the spark plug 23 and/or optionally a device for displacing a phase between a reference mark on the crankshaft 8 in a reference position of the crankshaft 8 and a reference mark on the camshaft 18.

Besides the cylinder Z1, further cylinders Z2 to Z4 may preferably also be provided, with which corresponding actuating elements are then also associated.

Figure 3:
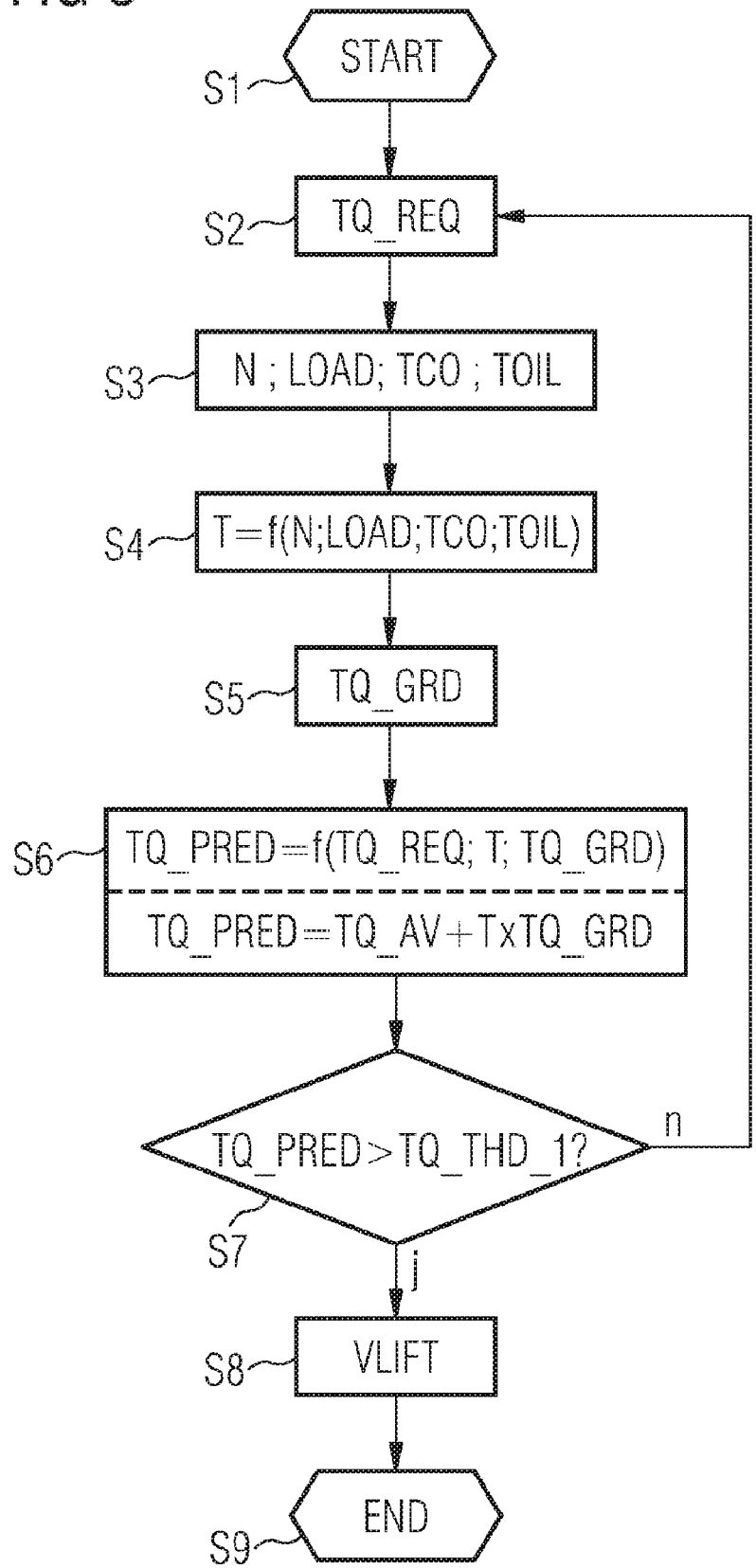
FIG. 3 shows a flow diagram of a first program for determining a switchover condition in order to initiate a valve-lift changeover in the internal combustion engine.

A first program (FIG. 3) for controlling the internal combustion engine is stored in a program memory of the control device 25 and is executed in the control device 25 while the internal combustion engine is running. The first program serves to prevent a jump in torque during the valve-lift changeover and contributes to precise controlling of the internal combustion engine during the valve-lift changeover. The first program is started in a step S1, in which variables are optionally initialized. The program may be preferably started at the same time as the internal combustion engine is started.

In a step S2, a torque requirement TQ_REQ of the internal combustion engine is detected. The torque requirement TQ_REQ comprises, for example, a desired torque which can be requested by a driver of the motor vehicle via the accelerator-pedal position of the accelerator pedal 27. The torque requirement TQ_REQ may, however, also comprise one or more requirements of vehicle functions, the requirements of which may be expressed as torque. The vehicle functions comprise, for example, a catalytic-converter heating function, an electronic power-steering function, an air-conditioning system and/or further vehicle functions.

In a step S3, at least one, preferably several, of the operating variables, for example a load variable LOAD dependent, for example, on the air-mass flow, and/or further operating variables dependent, for example, on the engine speed N, the coolant temperature TCO and/or the oil temperature TOIL, is/are determined. The operating state of the internal combustion engine, which operating state is represented by one or more of the operating variables, is representative of a dynamic behavior of the air-mass flow into the combustion chamber of the internal combustion engine and of an exhaust-gas flow out of the combustion chamber 9 into the exhaust section 4 of the internal combustion engine.

To prevent a jump in torque during valve-lift changeover, at least one, preferably several, preparatory measures for initiating the valve-lift changeover can be carried out. The valve-lift changeover can be effected from the high valve lift X2 to the low valve lift X1 and/or vice versa. The preparatory measures can comprise, for example, the actuation of at least one actuating element which does not act upon the valve-lift changeover, i.e. is an actuating element having no action on the valve-lift changeover. By means of the preparatory measures, account can be taken of a response time of the actuating element.

The preparatory measures comprise, if the internal combustion engine comprises the device for displacing the phase, for example, a displacing of the phase of the crankshaft 8 relative to the camshaft 18. The phase can be displaced, for example, such that an area of overlap in which the gas inlet valve 12 and the gas outlet valve 13 enable a gas exchange between the intake section 1 and the combustion chamber 9 or the exhaust section 4 and the combustion chamber 9 is reduced. In the area of overlap, exhaust gas can be forced into the intake section, the exhaust gas recirculated from the intake section 1 into the combustion chamber 9 again and exhaust gas recirculated from the exhaust section 4 into the combustion chamber 9. The reduced area of overlap reduces an exhaust-gas recirculation rate. The lower exhaust-gas recirculation rate enables, in order to prevent the jump in torque during the valve-lift changeover, a deterioration in an efficiency of the internal combustion engine through adjustment of an ignition angle, without the combustion of an air/fuel mix in the combustion chamber 9 becoming unstable.

As a further preparatory measure, for example, the phase of the camshaft before the valve-lift changeover can be set to a value of the phase after the valve-lift changeover, in order to prevent the jump in torque.

A further preparatory measure can, for example, be the altering of a degree of opening of the throttle valve 5. The altering of the degree of opening of the throttle valve 5 may, depending on the engine speed N and the load variable LOAD, impact fully on the air-mass flow into the combustion chamber 9 only over several working cycles of the crankshaft 8. The altering of the degree of opening of the throttle valve 5 may, for example, contribute toward preventing the jump in torque during the valve-lift changeover, in that, during the valve lift which produces the greater torque, the air-mass flow into the combustion chamber 9 is throttled by the throttle valve 5.

Depending on the engine speed N and the load variable LOAD, the preparatory measures will, due to the dynamic behavior of the intake section and/or the duration of actuation of the corresponding actuating element and/or the response time of the corresponding actuating element relative to the crankshaft angle, thus require a different time period T. The time period T may, for example, be representative of a corresponding crankshaft angle of the crankshaft 8. The determining of the time period T makes it possible for the preparatory measures for the valve-lift changeover to be initiated at the proper time. The time period T is determined in a step S4 preferably depending on the engine speed N and the load variable LOAD. The time period T can, in addition, also be determined depending on the cooling-water temperature TCO and/or the oil temperature TOIL of the internal combustion engine.

In a step S5, the gradient TQ_GRD of the torque requirement TQ_REQ is determined.

In a step S6, a predicted torque TQ_PRED is determined depending on the time period T and the gradient TQ_GRD of the torque requirement TQ_REQ, preferably using the computation rule specified in step S6. The predicted torque TQ_PRED is representative of the torque requirement TQ_REQ of the internal combustion engine after the time period T, given a linear change in the torque requirement TQ_REQ.

In a step S7, a check is carried out to ascertain whether the predicted torque TQ_PRED is greater than a predetermined first threshold value TQ_THD_1. If the condition in step S7 is not fulfilled, then the processing is continued in step S2. If the condition in step S7 is fulfilled, then the processing is continued in a step S8.

In step S8, the valve-lift changeover is carried out.

In a step S9, the first program can be terminated. However, while the internal combustion engine is running, the processing is preferably continued in a loop in step S2.

Figure 4:
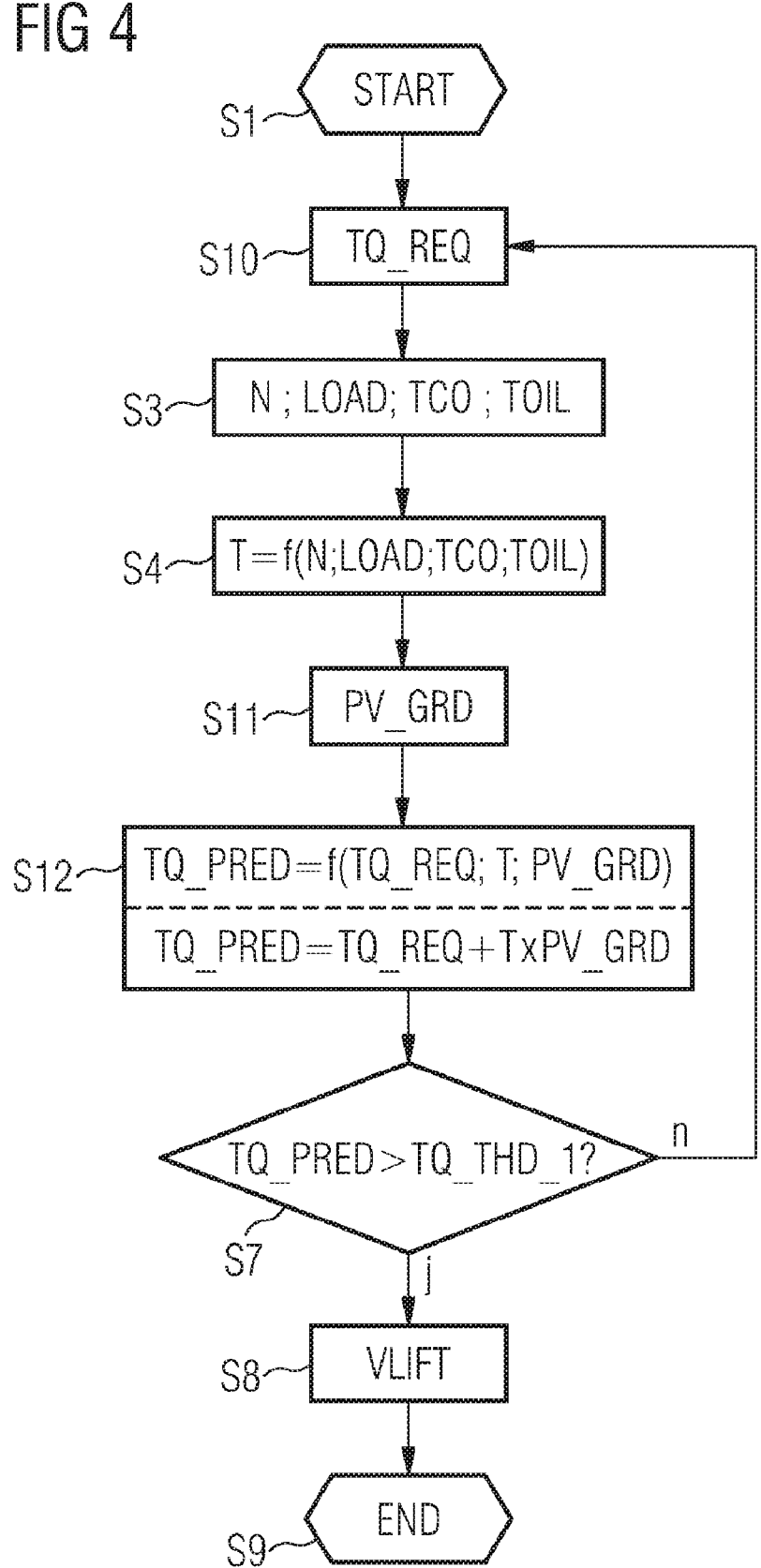
FIG. 4 shows a flow diagram of a second program for determining the switchover condition.

Alternatively, a second program (FIG. 4) for determining the switchover condition for initiating the valve-lift changeover can also be stored in the control device 25. The second program contributes toward preventing a jump in torque and can contribute to precise controlling of the internal combustion engine during the valve-lift changeover. The second program differs from the first program in steps S10, S11 and S12.

In step S11, a gradient PV_GRD of the accelerator-pedal position is determined.

In step S12, the predicted torque TQ_PRED is determined depending on the time period T and the gradient PV_GRD of the accelerator-pedal position, preferably using the computation rule specified in step S12.

Alternatively, a third program (FIG. 5) for determining the switchover condition for initiating the valve-lift changeover can be stored in the control device 25. The third program contributes toward preventing the jump in torque and can contribute to precise controlling of the internal combustion engine during the valve-lift changeover. The third program differs from the first and the second program in steps S13, S14, S15 and S16.

In step S13, an actual torque TQ_AV and the torque requirement TQ_REQ are detected.

In step S14, a difference TQ_REQ_DIF between the actual torque TQ and the torque requirement TQ_REQ is determined depending on the actual torque and the torque requirement TQ_REQ, preferably using the computation rule specified in step S14.

In step S15, a second threshold value TQ_THD_2 is determined depending on the difference TQ_REQ_DIF, preferably using the computation rule specified in step S15. Included in the computation rule in step S15 will preferably be a proportionality factor G, which can be determined, for example, on a test stand.

In step S16, a check is carried out to ascertain whether the torque requirement TQ_REQ is greater than the determined second threshold value TQ_THD_2. Alternatively, in step S16 a check can be carried out to ascertain whether the actual torque TQ_AV is greater than the determined second threshold value TQ_THD_2. If the condition in step S16 is not fulfilled, then the processing is continued in step S13. If the condition in step S16 is fulfilled, then the processing is continued in step S8.

The invention is not restricted to the exemplary embodiments described. For example, the different exemplary embodiments can be combined with one another. Thus, for example, in order to determine the switchover condition, the predicted torque TQ_PRED or the second threshold value TQ_THD_2 can be determined. Furthermore, the predicted torque TQ_PRED and/or the second threshold TQ_THD_2 can be determined depending on the gradient TQ_GRD of the torque requirement TQ_REQ and/or the gradient PV_GRD of the accelerator-pedal position and/or the difference TQ_REF_DIFF.

What is claimed is:

1. A method for determining a switchover condition in order to initiate a valve-lift changeover in an internal combustion engine, comprising
   an intake section and an exhaust section,
   at least one cylinder having a combustion chamber,
   a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled,
   a valve-lift adjustment device, by means of which a valve lift of the gas inlet valve and/or of the gas outlet valve can be adjusted,
the method comprising the steps of:
   determining a torque requirement,
   determining an operating variable of the internal combustion engine, which operating variable is representative of an operating state of the internal combustion engine,
   depending on the operating variable, determining a time period which is needed in the current operating state in order to carry out at least one preparatory measure for the valve-lift changeover,
   determining a change value which is representative of a change in the torque requirement, and
   depending on the torque requirement, initiating the time period and the change value, the valve-lift changeover.

2. The method according to claim 1, wherein
   depending on the torque requirement, the time period and the change value, a predicted torque which is representative of the torque requirement after the time period, given a linear change in the torque requirement over the time period, is determined,
   depending on the predicted torque, the valve-lift changeover is initiated if the predicted torque exceeds a predetermined first threshold value.

3. The method according to claim 1, wherein, depending on the time period and the change value which is representative of a change in the torque requirement, a second threshold value is determined, and the valve-lift changeover is initiated if the torque requirement exceeds the determined second threshold value.

4. The method according to claim 1, wherein the change value which is representative of the change in the torque requirement comprises a gradient of the torque requirement and/or a gradient of a pedal value.

5. The method according to claim 1, wherein the operating variable which is representative of the operating state of the internal combustion engine comprises an engine speed and/or a load variable and/or an oil temperature and/or a cooling water temperature of the internal combustion engine.

6. A method for determining a switchover condition in order to initiate a valve-lift changeover in an internal combustion engine, comprising
   an intake section and an exhaust section,
   at least one cylinder having a combustion chamber,
   a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled,
   a valve-lift adjustment device, by means of which a valve lift of the gas inlet valve and/or of the gas outlet valve can be adjusted,
the method comprising the steps of:
   determining a torque requirement and an actual torque,
   determining an operating variable of the internal combustion engine, which operating variable is representative of an operating state of the internal combustion engine,
   depending on the operating variable, determining a time period which is needed in the current operating state in order to carry out at least one preparatory measure for the valve-lift changeover,
   depending on the actual torque, initiating the torque requirement and the time period, the valve-lift changeover.

7. The method according to claim 6, wherein
   depending on the actual torque, the torque requirement and the time period, a predicted torque which is representative of the actual torque after the time period, given a linear change in the actual torque over the time period, is determined,
   depending on the predicted torque, the valve-lift changeover is initiated if the predicted torque exceeds a predetermined first threshold value.

8. The method according to claim 6, wherein, depending on the time period, the torque requirement and the actual torque, a second threshold value is determined, and the valve-lift changeover is initiated if the torque requirement or the actual torque exceeds the determined second threshold value.

9. The method according to claim 6, wherein the time period is determined depending on a difference between the torque requirement and the actual torque.

10. The method according to claim 6, wherein the operating variable which is representative of the operating state of the internal combustion engine comprises an engine speed and/or a load variable and/or an oil temperature and/or a cooling water temperature of the internal combustion engine.

11. A device for determining a switchover condition in order to initiate a valve-lift changeover in an internal combustion engine, comprising an intake section and an exhaust section, at least one cylinder having a combustion chamber, a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled, a valve-lift adjustment device, by means of which a valve lift of the gas inlet valve and/or of the gas outlet valve can be adjusted, wherein the device is operable to determine a torque requirement, determine an operating variable of the internal combustion engine, which operating variable is representative of an operating state of the internal combustion engine, determine, depending on the operating variable, a time period which is needed in the current operating state in order to carry out preparatory measures for the valve-lift changeover, determine a change value which is representative of a change in the torque requirement, and to initiate the valve-lift changeover depending on the torque requirement, the change value and the time period.

12. The device according to claim 11, wherein the device is further operable to determine, depending on the torque requirement, the time period and the change value, a predicted torque which is representative of the torque requirement after the time period, given a linear change in the torque requirement over the time period, and to initiate, depending on the predicted torque, the valve-lift changeover if the predicted torque exceeds a predetermined first threshold value.

13. The device according to claim 11, wherein the device is further operable to determine, depending on the time period and the change value which is representative of a change in the torque requirement, a second threshold value, and to initiate the valve-lift changeover if the torque requirement exceeds the determined second threshold value.

14. The device according to claim 11, wherein the change value which is representative of the change in the torque requirement comprises a gradient of the torque requirement and/or a gradient of a pedal value.

15. The device according to claim 11, wherein the operating variable which is representative of the operating state of the internal combustion engine comprises an engine speed and/or a load variable and/or an oil temperature and/or a cooling water temperature of the internal combustion engine.

16. The device for determining a switchover condition in order to initiate a valve-lift changeover in an internal combustion engine, comprising an intake section and an exhaust section, at least one cylinder having a combustion chamber, a gas inlet valve and a gas outlet valve, by means of which a gas exchange between the intake section and the combustion chamber or the combustion chamber and the exhaust section is prevented when the gas inlet valve or the gas outlet valve is in a closed position and is otherwise enabled, a valve-lift adjustment device, by means of which a valve lift of the gas inlet valve and/or of the gas outlet valve can be adjusted, wherein the apparatus is operable to determine a torque requirement and an actual torque, determine an operating variable of the internal combustion engine, which operating variable is representative of an operating state of the internal combustion engine, determine, depending on the operating variable, a time period which is needed in the current operating state in order to carry out preparatory measures for the valve-lift changeover, and to initiate the valve-lift changeover depending on the torque requirement, the actual torque and the time period.

17. The device according to claim 16, wherein the device is further operable to determine, depending on the actual torque, the torque requirement and the time period, a predicted torque which is representative of the actual torque after the time period, given a linear change in the actual torque over the time period, and to initiate, depending on the predicted torque, the valve-lift changeover if the predicted torque exceeds a predetermined first threshold value.

18. The device according to claim 16, wherein the device is further operable to determine, depending on the time period, the torque requirement and the actual torque, a second threshold value, and to initiate the valve-lift changeover if the torque requirement or the actual torque exceeds the determined second threshold value.

19. The device according to claim 16, wherein the time period is determined depending on a difference between the torque requirement and the actual torque.

20. The method according to claim 16, wherein the operating variable which is representative of the operating state of the internal combustion engine comprises an engine speed and/or a load variable and/or an oil temperature and/or a cooling water temperature of the internal combustion engine.

* * * * *